(12) United States Patent
Kim et al.

(10) Patent No.: US 11,930,277 B2
(45) Date of Patent: Mar. 12, 2024

(54) ELECTRONIC DEVICE AND TIME-LAPSE IMAGE GENERATION METHOD OF ELECTRONIC DEVICE

(71) Applicant: SAMSUNG ELECTRONICS CO., LTD., Suwon-si (KR)

(72) Inventors: Seunghun Kim, Suwon-si (KR); Jonghun Won, Suwon-si (KR); Haesun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/886,224

(22) Filed: Aug. 11, 2022

(65) Prior Publication Data
US 2022/0394166 A1 Dec. 8, 2022

Related U.S. Application Data

(63) Continuation of application No. PCT/KR2021/001201, filed on Jan. 29, 2021.

(30) Foreign Application Priority Data

Feb. 11, 2020 (KR) ........................ 10-2020-0016179

(51) Int. Cl.
H04N 23/73 (2023.01)
H04N 5/915 (2006.01)
(52) U.S. Cl.
CPC ............. *H04N 23/73* (2023.01); *H04N 5/915* (2013.01)
(58) Field of Classification Search
CPC .......... H04N 23/73; H04N 5/915; H04N 5/77; H04N 23/60; H04N 23/632
See application file for complete search history.

(56) References Cited

U.S. PATENT DOCUMENTS 9,324,376 B2 4/2016 Doepke
9,414,038 B2 8/2016 Johar
(Continued)

FOREIGN PATENT DOCUMENTS

KR 10-2018-0093660 A 8/2018

OTHER PUBLICATIONS

"APEX System", Wikipedia, Jun. 26, 2021, https://en.wikipedia.org/w/index.php?title=APEX_system&oldid=1030515750, (6 total pages).
(Continued)

*Primary Examiner* — Ahmed A Berhan
(74) *Attorney, Agent, or Firm* — Sughrue Mion, PLLC

(57) ABSTRACT

An electronic device includes a display; a camera; a memory; and a processor operatively connected to the display, the camera, and the memory where the memory stores instructions which, when executed, enable the processor to determine a number of at least one source frame per unit second based on a specified maximum exposure time, receive light reflected from an external object by using the camera, for an exposure time determined according to a specified exposure value, generate source frames based on the received light, and generate a time-lapse image including at least one target frame indicating movement of the external object based on source frames, and the instructions cause the processor to generate the source frames at a speed different from a speed at which the time-lapse image including the at least one target frame is played.

20 Claims, 14 Drawing Sheets

(56) References Cited

U.S. PATENT DOCUMENTS

| | | | |
|---|---|---|---|
| 9,426,409 B2 | 8/2016 | Beysserie et al. |
| 9,524,575 B2 | 12/2016 | Karpenko et al. |
| 9,609,299 B2 | 3/2017 | Johar |
| 9,774,784 B2 | 9/2017 | Karpenko et al. |
| 9,992,443 B2 | 6/2018 | Titi et al. |
| 10,192,582 B2 | 1/2019 | Singhal et al. |
| 10,341,630 B2 | 7/2019 | Johar |
| 10,623,689 B2 | 4/2020 | Jin et al. |
| 10,652,465 B2 | 5/2020 | Karpenko et al. |
| 10,771,712 B2 | 9/2020 | Bessou et al. |
| 10,972,686 B2 | 4/2021 | Kim et al. |
| 11,070,742 B2 | 7/2021 | Bessou et al. |
| 2014/0105564 A1 | 4/2014 | Johar |
| 2015/0043893 A1* | 2/2015 | Nishizaka ............ G11B 27/005 386/278 |
| 2015/0350544 A1* | 12/2015 | Williams ............... H04N 5/265 348/239 |
| 2015/0350591 A1 | 12/2015 | Titi et al. |
| 2016/0093335 A1 | 3/2016 | Doepke |
| 2016/0094801 A1 | 3/2016 | Beysserie et al. |
| 2016/0180559 A1 | 6/2016 | Karpenko et al. |
| 2016/0343402 A1 | 11/2016 | Singhal et al. |
| 2017/0034441 A1 | 2/2017 | Karpenko et al. |
| 2017/0359517 A1 | 12/2017 | Karpenko et al. |
| 2019/0098196 A1 | 3/2019 | Bessou |
| 2019/0110019 A1 | 4/2019 | Jin et al. |
| 2019/0364231 A1 | 11/2019 | Kim et al. |
| 2020/0366828 A1 | 11/2020 | Bessou et al. |
| 2021/0344829 A1 | 11/2021 | Bessou et al. |

OTHER PUBLICATIONS

International Search Report (PCT/ISA210 and PCT/ISA/220) and Written Opinion (PCT/ISA/237) issued by the International Searching Authority in International Application No. PCT/KR/2021/001201 dated May 20, 2021.

* cited by examiner

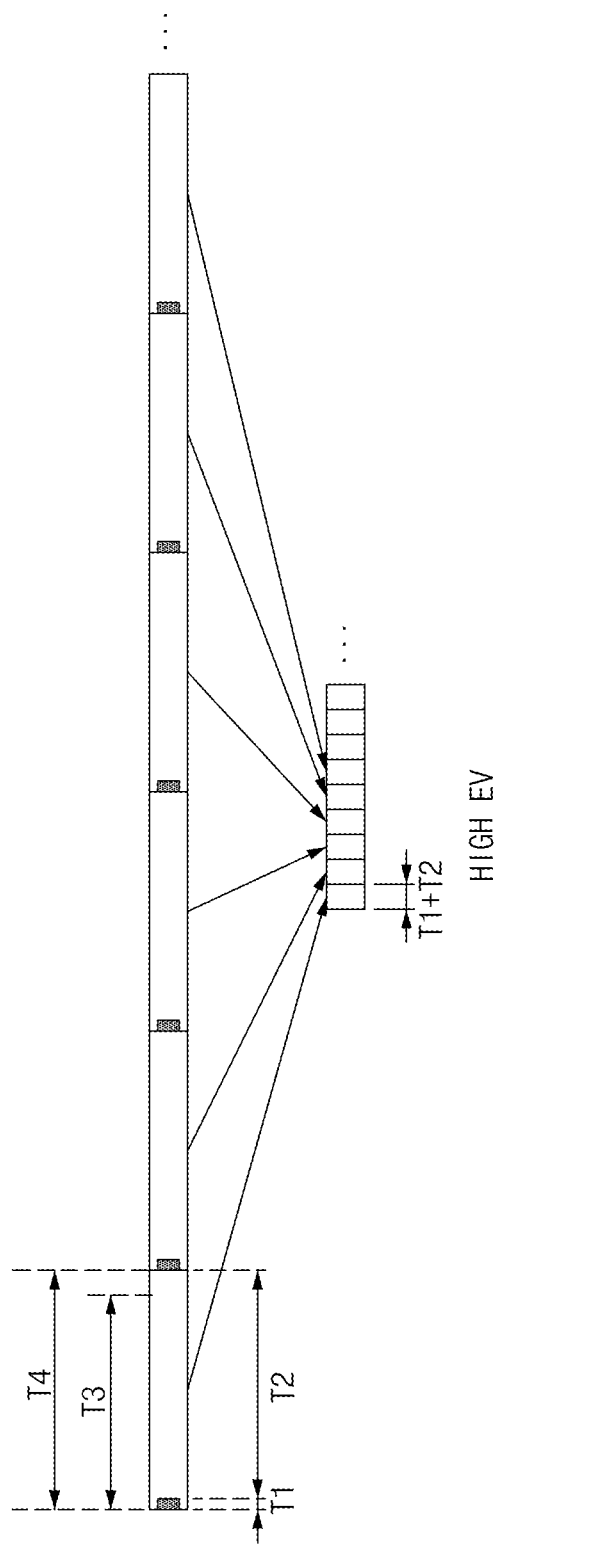

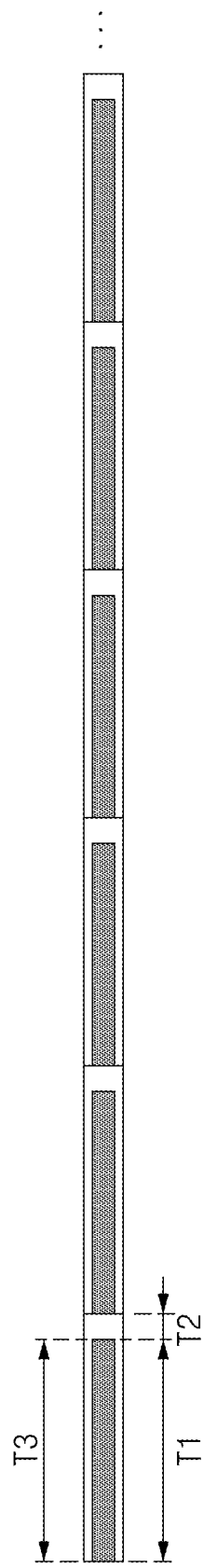

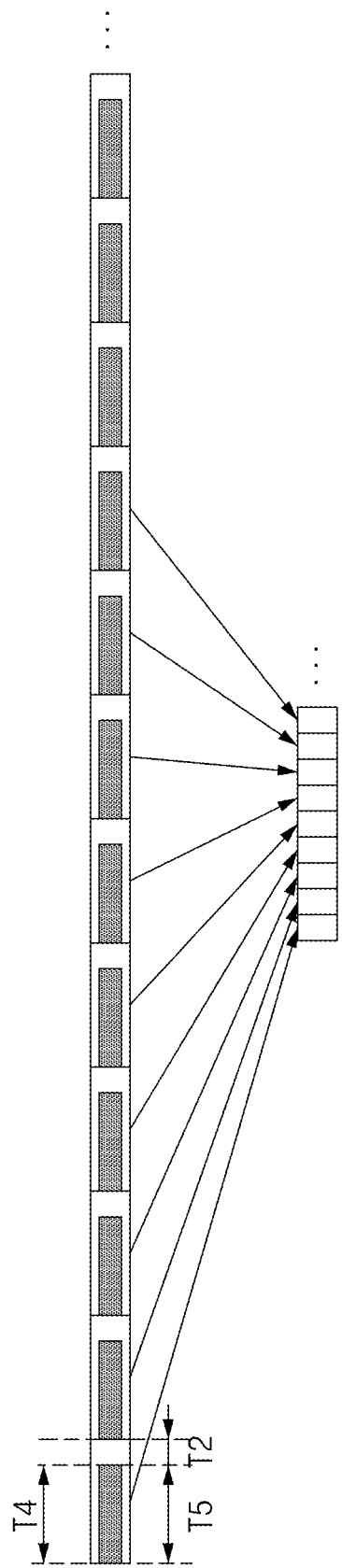

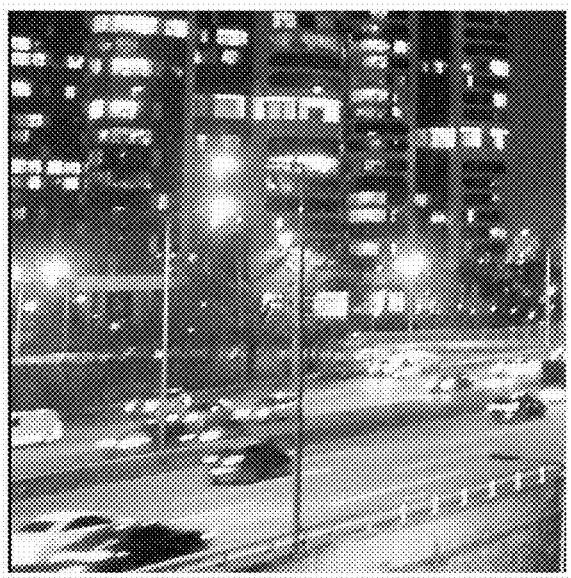
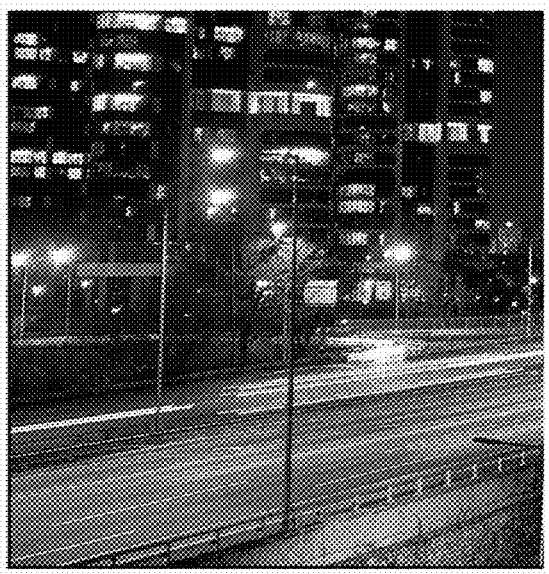
1110  1130
FIG.11

ELECTRONIC DEVICE AND TIME-LAPSE IMAGE GENERATION METHOD OF ELECTRONIC DEVICE

CROSS-REFERENCE TO RELATED APPLICATION(S)

This application is a bypass continuation of PCT International Application No. PCT/KR2021/001201 filed on Jan. 29, 2021, which is based on and claims priority under 35 U.S.C. § 119 to Korean Patent Application No. 10-2020-0016179 filed on Feb. 11, 2020, in the Korean Intellectual Property Office, the disclosures of which are incorporated by reference herein in their entirety.

BACKGROUND

1. Field

Various embodiments disclosed in the disclosure relate to an electronic device for generating a time-lapse image and a technology for controlling the electronic device.

2. Description of Related Art

Time-lapse (or hyperlapse) may refer to an image capture method for performing sampling having a relatively large sampling speed (e.g., 30 Fps) with respect to a frame in which an external object is captured and making a speed when capturing the external object and a speed when playing the completed image different from each other. For example, when playing an image, obtained at 1 frame per second, at a speed of 30 frames per second, a user may recognize that the speed of the image increases to 30 times. The image captured using the time-lapse method may be referred to as a time-lapse image (or a hyperlapse image).

Because the time-lapse image is able to display images captured during a relatively shorter time than a video, it needs a smaller storage space than the video. A plurality of electronic devices such as smartphones provide a function of generating the time-lapse image.

Various embodiments disclosed in the disclosure are to provide an electronic device for setting a maximum exposure time, obtaining source frames indicating an external object at a first speed corresponding to the maximum exposure time using a camera, and generating a time-lapse image including target frames to be played at a second speed different from the first speed using the obtained source frames and a control method of the electronic device.

Various embodiments disclosed in the disclosure are to provide an electronic device for obtaining source frames indicating an external object using a camera, controlling whether to sample the obtained source frames or a sampling period, and generating a time-lapse image including target frames using the obtained source frames and a control method of the electronic device.

SUMMARY

In accordance with an aspect of the disclosure, an electronic device may include a display, a camera, a memory, and a processor operatively connected with the display, the camera, and the memory. According to an embodiment, the memory may store instructions, when executed, causing the processor to determine a number of at least one source frame per unit second based on a specified maximum exposure time, receive light reflected from an external object, during an exposure time determined according to a specified exposure value, using the camera, generate source frames based on the received light, and generate a time-lapse image including at least one target frame indicating motion of the external object over time based on the source frames, and the instructions may cause the processor to generate the source frames at a speed different from a speed at which the time-lapse image including the at least one target frame is played.

Each of the source frames may include a first interval corresponding to the exposure time and a second interval corresponding to a predetermined readout time, and the first interval decreases in magnitude as the specified exposure value increases.

The source frames may be generated at a speed less than the speed at which the time-lapse image including the at least one target frame is played.

The instructions may cause the processor to include all the source frames in the time-lapse image.

The instructions may cause the processor to include some of the source frames in the time-lapse image.

The number of the at least one source frame per unit second may be greater than or equal to N, and the instructions may cause the processor to select source frames every N among the generated source frames, and generate the time-lapse image including the selected source frames.

The instructions may cause the processor to maintain an auto focusing (AF) function of the camera for automatically adjusting focus on the external object in a lock state.

The instructions may cause the processor to make a number in which the at least one source frame is generated per unit second and a number of the at least one target frame played per unit second when the time-lapse image including the at least one target frame is played on the display, different from each other.

The instructions may cause the processor to display a preview image on the display while the time-lapse image is generated.

The different speed may include a first speed and a second speed corresponding to a magnitude different from the first speed.

In accordance with another aspect of the disclosure, a control method of an electronic device may include setting a maximum exposure time, determining a number of at least one source frame per unit second based on the maximum exposure time, receiving light reflected from an external object during an exposure time determined according to a specified exposure value, and generating a time-lapse image including at least one target frame indicating motion of the external object over time based on the source frames where the generating of the source frames may further include generating the source frames at a speed different from a speed at which the time-lapse image including the at least one target frame is played.

In accordance with an aspect of the disclosure, there is provided a non-transitory computer-readable storage medium having recorded thereon a program for executing the control method of the electronic device.

BRIEF DESCRIPTION OF THE DRAWINGS

The above and other aspects, features, and advantages of certain embodiments of the present disclosure will be more apparent from the following description taken in conjunction with the accompanying drawings. With regard to description of drawings, the same or similar components may be marked by the same or similar reference numerals.

FIGS. 4A and 4B are drawings for describing that a time-lapse image is generated, according to various embodiments;

FIGS. 8A and 8B are drawings for describing contents of varying a speed at which source frames shown in FIG. 7 are generated;

FIG. 11 is a drawing illustrating a time-lapse image, according to various embodiments.

DETAILED DESCRIPTION

Figure 1:
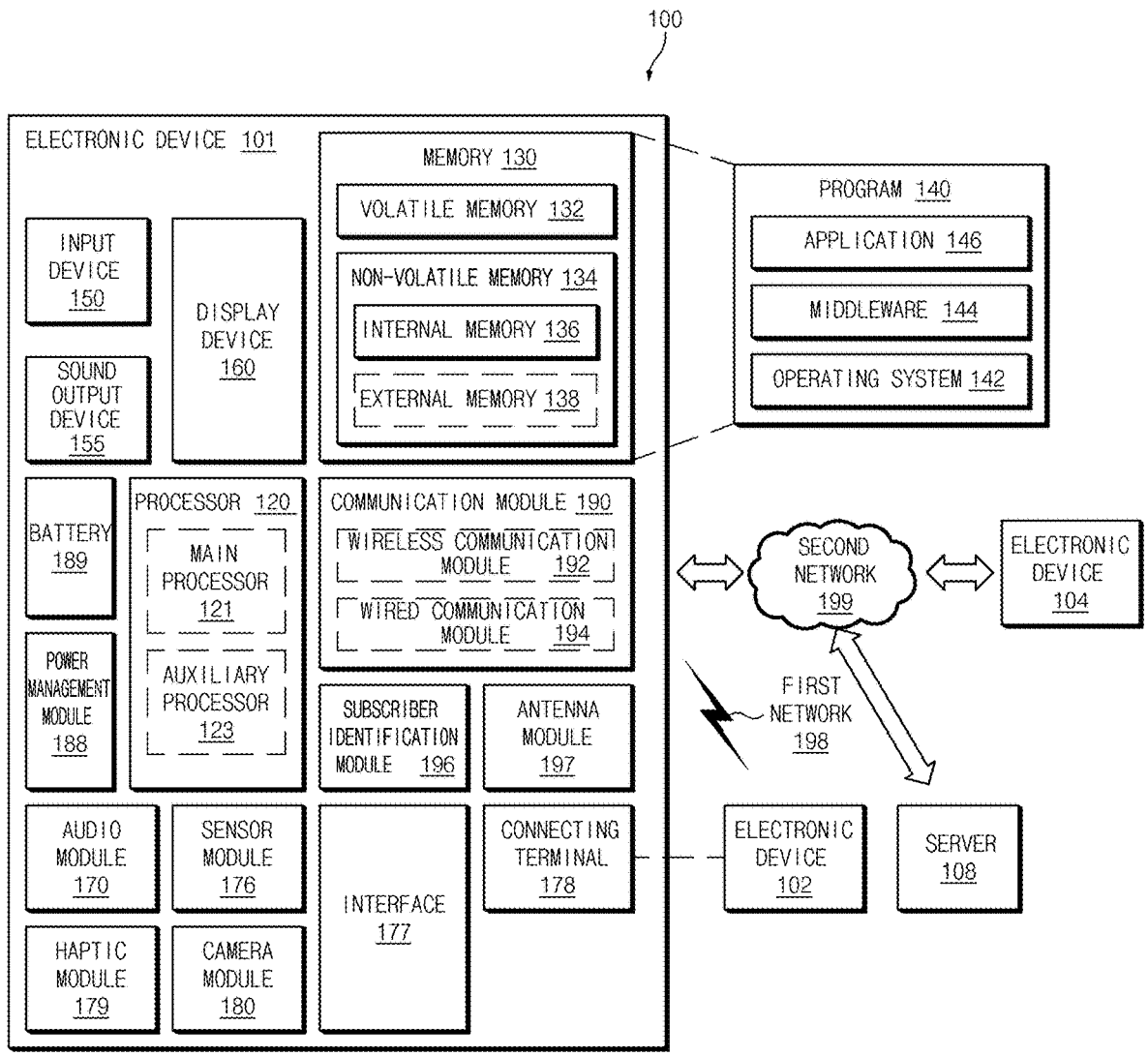
FIG. 1 illustrates an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth, wireless-fidelity (Wi-Fi) direct, or infrared data association (IrDA)) or the second network 199 (e.g., a long-range communication network, such as a cellular network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

According to an embodiment, the camera module 180 may generate a time-lapse image. For example, the camera module 180 may capture an external object to obtain source frames at a first speed under control of the processor 120. According to an embodiment, the processor 120 may generate a time-lapse image using the source frames generated at the first speed. According to an embodiment, the time-lapse image may include one or more target frames. According to an embodiment, the processor 120 may process the target frames included in the time-lapse image to be played at a second speed different from the first speed. For example, the camera module 180 may obtain source frames at a speed of 1 Fps. For example, the processor 120 may generate a time-lapse image to be played at a speed of 30 Fps using the source frames. For example, the playback speed of the one or more target frames included in the time-lapse image may be different from a speed at which the source frames are obtained.

According to another embodiment, the processor 120 may control the camera module 180 to obtain source frames at two or more different speeds while the one time-lapse image is generated. According to an embodiment, the electronic device 101 (or the processor 120) may display a preview image on the display device 160, while one time-lapse image is generated. The preview image may be an image displayed in real time, before the storage of the time-lapse image in the memory 130 is completed. The user may identify the preview image in real time, while the time-lapse image is generated. According to an embodiment, the electronic device 101 may obtain source frames at two or more different speeds. According to an embodiment, the electronic device may change or adjust a playback speed of the preview image displayed in real time based on the speed of the obtained source frames.

According to an embodiment, the electronic device 101 (or the processor 120) may omit or skip sampling for the source frames. Because all the source frames are able to be included in the time-lapse image, a smooth time-lapse image may be obtained. According to another embodiment, the electronic device 101 (or the processor 120) may change or adjust a sampling period for source frames.

According to an embodiment, the processor 120 may capture an external object and may control a speed at which the source frames are obtained and a playback speed of the time-lapse image generated using the source frames to be different from each other. According to an embodiment, in a state where sensitivity (e.g., ISO sensitivity) of a sensor included in the camera module 180 remains low, the time-lapse image may be obtained. In an environment (e.g., at night) where the sensitivity of the sensor remains low and the amount of light is insufficient, a speed at which source frames are obtained may be controlled slowly using a relatively long maximum exposure time. The processor 120 may generate a time-lapse image having a relatively fast playback speed using the obtained source frames. The time-lapse image may include target frames, and a playback speed of the target frames may be different from a speed at which the source frames are obtained.

Figure 2:
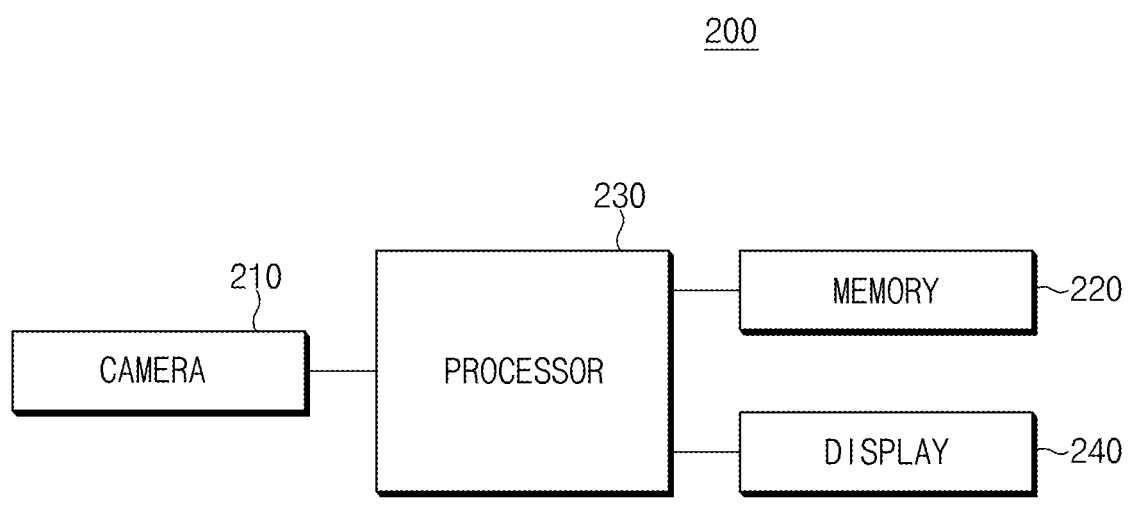
FIG. 2 is a block diagram of an electronic device, according to various embodiments.

FIG. 2 is a block diagram of an electronic device, according to various embodiments.

According to an embodiment, an electronic device 200 (e.g., the electronic device 101 of FIG. 1) may include a camera 210 (e.g., the camera module 180 of FIG. 1), a memory 220 (e.g., the memory 130 of FIG. 1), a processor 230 (e.g., the processor 120 of FIG. 1), and a display 240 (e.g., the display device 160 of FIG. 1).

According to an embodiment, the camera 210 may capture a still image and a moving image. The camera 210 may capture a time-lapse (hyperlapse) image indicating motion or a form of an external object over time, using light reflected from the external object. For example, the time-lapse image may refer to a completed image in which a speed where the external object is captured and a speed where the completed image is played are different from each other. For example, a difference in image capture time between frames included in the time-lapse image when the time-lapse image is captured may be greater than a difference in playback time between frames included in the time-lapse image when the time-lapse image is played. According to an embodiment, the time-lapse image may be stored in the form of a file including at least one frame. For example, the time-lapse image may be compressed according to a standard, such as MPEG4, H.264/AVC, or WMV, and may be stored as a video file. The time-lapse image may be stored in various types of video file formats such as MPG, MP4, 3gpp, avi, asf, and mov. According to an embodiment, under of the processor 230, the camera 210 may receive light reflected from an external object, which corresponds to a maximum exposure time and an exposure time determined by an exposure value. The camera 210 may convert the received light into an electrical signal to generate the time-lapse image. The maximum exposure time may be set by an input of a user. In another embodiment, the maximum exposure time may be set or specified by an operation of the processor 230.

According to an embodiment, the camera 210 may include at least a part of the camera module 180 shown in FIG. 1.

According to an embodiment, the memory 220 may store at least one program, an application, data, or instructions executed by the processor 230. According to an embodiment, the memory 220 may include at least a part of the memory 130 shown in FIG. 1.

According to an embodiment, the processor 230 may allow the camera 210 to generate a time-lapse image depending on the set maximum exposure time and may store the generated time-lapse image in the memory 220. According to an embodiment, the processor 230 may set the maximum exposure time. For example, the maximum exposure time may be set by an input of the user. In another example, the maximum exposure time may be specified by the program 140 of FIG. 1.

According to an embodiment, the display 240 may display a preview image, while the camera 210 captures an external object, under control of the processor 230. The display 240 may display the preview image, while the camera 210 generates the time-lapse image using the external object, under control of the processor 230. The display 240 may display a time-lapse image depending on an instruction causing the processor 230 to play the time-lapse image. According to an embodiment, the display 240 may include at least a part of the display device 160 shown in FIG. 1.

According to an embodiment, the processor 230 may receive an input instructing to generate a time-lapse image from the user. The processor 230 may set the maximum exposure time of the camera 210 depending on an input of the user or a program stored in the memory 220. An image acquisition speed of the camera 210 may be determined using the set maximum exposure time and a resetting time including a predetermined readout time. The image acquisition speed of the camera 210 may be determined by Equation 1 below.

$$v1 = \text{frames per second}(fps) = \frac{1}{a+b} \quad \text{[Equation 1]}$$

In Equation 1 above, v1 corresponds to the image acquisition speed according to an embodiment, a corresponds to the maximum exposure time according to an embodiment, and b corresponds to the resetting time according to an embodiment. According to an embodiment, the maximum exposure time may be varied according to a condition of the inside (e.g., the program stored in the memory 220) of the electronic device 200 or the outside (e.g., an input of the user) of the electronic device 200. Therefore, according to Equation 1 above, the image acquisition speed may be varied according to the maximum exposure time. In other words, a speed at which the camera 210 obtains an image for the external object to generate the time-lapse image may be varied according to the condition of the insider or outside of the electronic device 200.

According to an embodiment, the processor 230 may generate a time-lapse image using the image obtained by the camera 210. In detail, the camera 210 may obtain an image using light reflected from the external object. The image obtained to generate the time-lapse image by the camera 210 may include source frames. In an embodiment, the camera 210 may obtain the source frames to generate a time-lapse image. The processor 230 may generate a time-lapse image including at least one target frame using the source frames. In other words, the time-lapse image may include the at least one target frame. The processor 230 may generate a time-lapse image having a speed different from a speed at which the camera 210 obtains an image of the source frames. According to an embodiment, a speed (unit: Fps) at which the camera 210 captures the external object to obtain source frames and a speed (unit: Fps) at which the time-lapse image finally generated by the processor 230 is played may be different from each other. For example, the camera 210 may capture an external object at a speed of 1 Fps, and the processor 230 may generate a time-lapse image to be played at a speed of 30 Fps. The generated time-lapse image may be stored in the memory 220.

In another embodiment, the processor 230 may allow the display 240 to display a preview image for the time-lapse image before the operation where the time-lapse image is generated is completed. The preview image may be an image displayed on the display 240, while the camera 210 captures the external object. The user may recognize the preview image by means of the display 240, while the time-lapse image is generated.

According to an embodiment, when the camera 210 captures the external object, the processor 230 may vary a speed at which the camera 210 obtains source frames. For example, the processor 230 may control the camera 210 which captures the external object from one image to obtain source frames at any one selected between a first speed and a second speed, which are different from each other. According to an embodiment, the speed at which the source frames are obtained from the one image may change from the first speed to the second speed. For example, under control of the processor 230, the camera 210 may obtain source frames at the second speed different from the first speed, while obtaining source frames at the first speed. The one image may refer to an image until an input allowing the user to generate the time-lapse image is input to the electronic device 200, after an input instructing the user to generate the time-lapse image is input to the electronic device 200. In detail, the processor 230 may vary a speed at which the source frames are obtained from the same image, such that the playback speed of the preview image displayed on the display 240 may be varied. For example, the camera 210 may vary a speed to obtain source frames at a speed of 20 Fps, while capturing an external object to obtain source frames at a speed of 1 Fps. Because the display 240 displays the preview image in real time, a preview image having a speed of 20 Fps faster than 1 Fps may be displayed on the display 240. Finally, the processor 230 may generate a time-lapse image to be played at a predetermined speed (e.g., 30 Fps). The processor 230 may process target frames to correspond to the predetermined speed (e.g., 30 Fps) to generate a time-lapse image.

Figure 3A:
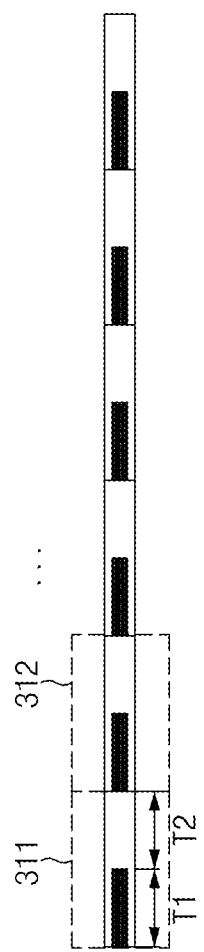
FIGS. 3A and 3B are drawings for describing that a time-lapse image is generated, according to various embodiments.
Figure 3B:
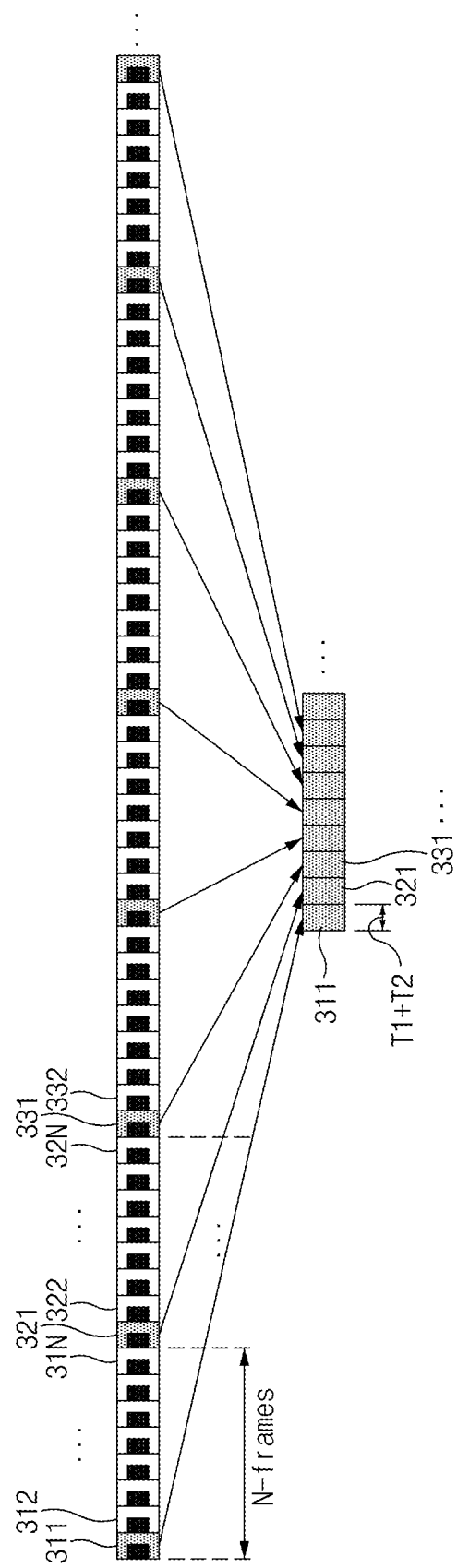

FIGS. 3A and 3B are drawings for describing that a time-lapse image is generated, according to various embodiments.

According to an embodiment, an electronic device (e.g., the electronic device 101 of FIG. 1 or the electronic device 200 of FIG. 2) may generate a time-lapse image in which a speed at which frames are obtained when capturing the external object and a playback speed of frames played when playing a completed image are different from each other. When executing a time-lapse function in the electronic device or an image acquisition device, a camera (particularly, a sensor) in the electronic device may obtain an image at a predetermined speed. For instance, the camera in the electronic device may obtain an image at a speed of 30 frames per second (hereinafter 'Fps'). The camera may sample some of the obtained images to generate a time-lapse image and may store it in the internal memory. For instance, the camera may sample one frame every 30 frames to generate a time-lapse image. Because the sampled frames are played, the stored time-lapse image may be played at a speed 30 times faster than before.

According to an embodiment, the time-lapse function of the electronic device may obtain an image from the sensor of the camera during a predetermined maximum exposure time (e.g., ⅓₀ seconds). Thus, when the image is captured using the time-lapse function at night with the insufficient amount of light, ISO speed or ISO sensitivity of the sensor may be increased to adjust brightness. The finally stored image may include more noise, due to the increased sensitivity of the sensor. Furthermore, by sampling the obtained image, the finally stored image may include a portion of the obtained image, pieces of motion included in the other image which is discarded may fail to be represented on the finally stored image. In the reality where the camera function of the electronic device is used in various environments, a requirement for obtaining a high-performance smooth time-lapse image is increased. Hereinafter, a frame obtained when the external object is captured is referred to as a source frame, and a frame included in the completed time-lapse image is referred to as a target frame. For convenience of description, it is assumed that both of a speed at which the source frames are generated or obtained and a speed at which the target frames are generated or played are 30 Fps in FIGS. 3A and 3B.

Referring to FIG. 3A, one source frame 311 or 312 may include an exposure time T1 and a resetting time T2. The exposure time T1 may refer to a time when light reflected from an external object is received through the sensor of the camera included in the electronic device. According to an embodiment, the resetting time T2 may include a readout time when the sensor which receives light converts the light into an electrical signal or outputs the converted electrical signal. The resetting time T2 may further include a waiting time for resetting the sensor to read a next frame. For example, the waiting time may include a time waiting until the sensor included in the camera starts to obtain the second source frame 312 subsequent to completing the acquisition of the first source frame 311. For example, the exposure time T1 for one frame may be 30 ms. The resetting time T2 may be 3.33 ms. In this case, the resetting time T2 may include a readout time of 3 ms and a waiting time of 0.33 ms. In another embodiment, the resetting time T2 may include only a readout time of 3.33 ms.

According to an embodiment, it may include a time when the sensor converts the received light into an electrical signal, outputs the converted electrical signal, and waits until receiving light in a next frame during the resetting time T2. According to another embodiment, the sensor may convert the received light into an electrical signal and may output the converted electrical signal during the resetting time T2. The sensor may receive light corresponding to a next frame, except for a waiting time.

Referring to FIG. 3A, the source frame may include the first source frame 311 obtained when the camera captures an external object and the second source frame 312 subsequent to the first source frame 311. According to an embodiment, the camera may receive light corresponding to the first source frame 312, during the exposure time T1 through the sensor. The camera may convert the received light into an electrical signal, during the resetting time T2 of the first source frame 311, and may wait until receiving light corresponding to the subsequent second source frame 312. In another embodiment, the camera may convert the received light into an electrical signal, during the resetting time T2 of the first source frame 311, and may receive light corresponding to the subsequent second source frame 312 without a waiting time.

Referring to FIG. 3B, the camera (e.g., the camera module 180 of FIG. 1 or the camera 210 of FIG. 2) included in the electronic device may generate or obtain N source frames 311 to 31N for one second. For next one second, the camera may generate or obtain the consecutive N source frames 321 to 32N. Assuming that the speed at which the source frame is generated is 30 Fps, the camera may generate 30 source frames for one second. Each of the source frames may include an exposure time and a resetting time. For example, a time corresponding to each of the source frames may be 1/30 seconds, which may be about 33.333 milliseconds. A processor (e.g., the processor 120 of FIG. 1 or the processor 230 of FIG. 2) included in the electronic device may select target frames using source frames and may generate a time-lapse image including the selected target frames. The target frames may be selected one by one every N source frames by means of sampling. For instance, a third source frame 311, a fourth source frame 321, a fifth source frame 331, or the like may be selected as a target frame. A time-lapse image continuously including the selected target frames may be generated. A time when one target frame is played, which is included in the time-lapse image, may be 33.333 milliseconds to be the same as a time when one source frame is generated. According to an embodiment, a speed at which the sensor obtains an image from an external object and a speed at which the completed and stored time-lapse image is played may be the same as each other.

Figure 4A:
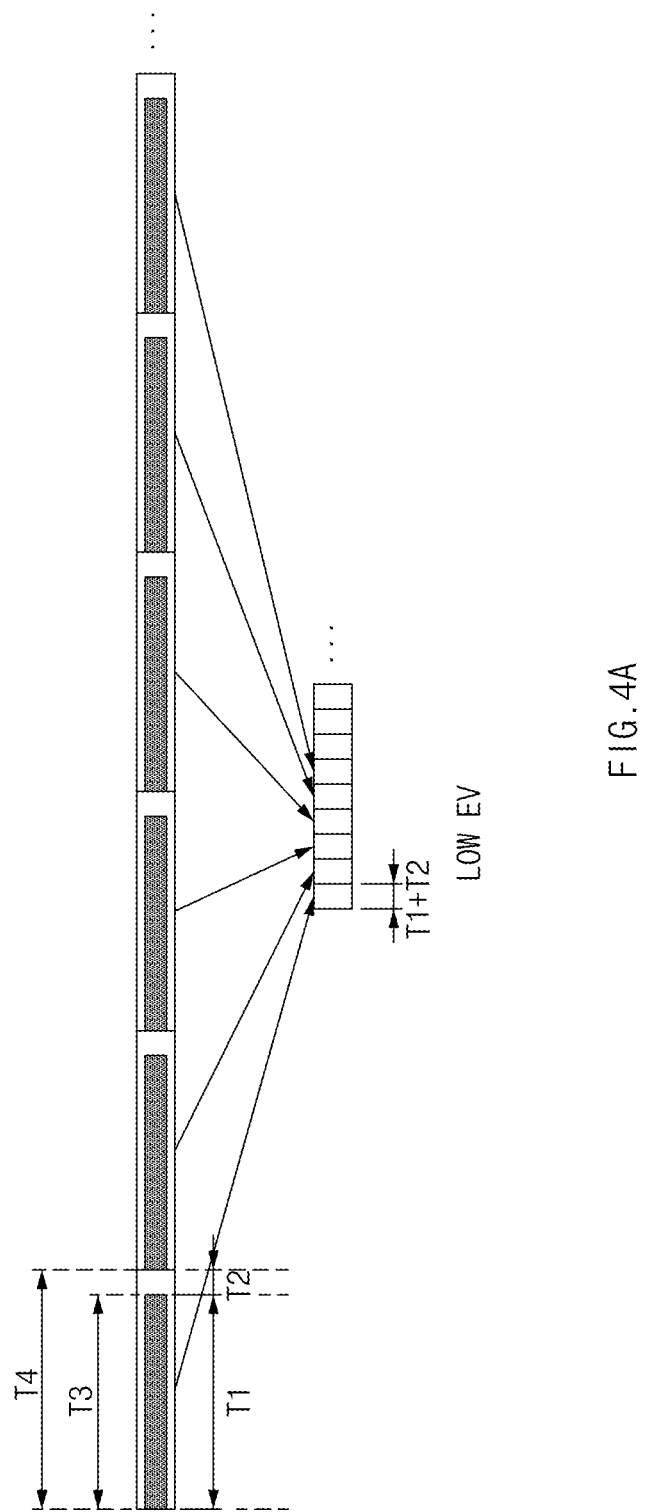

FIGS. 4A and 4B are drawings for describing that a time-lapse image is generated, according to various embodiments.

A time-lapse image generated at a low exposure value (EV) will be described with reference to FIG. 4A, and a time-lapse image generated at a high EV will be described with reference to FIG. 4B. Referring to FIGS. 4A and 4B, an exposure time T1 when a camera receives light may be illustrated. Referring to FIGS. 4A and 4B, a resetting time T2 when the camera resets a sensor to read a next frame may be illustrated.

According to an embodiment, the resetting time T2 may include a readout time when the sensor included in the camera converts the received light into an electrical signal or outputs the converted electrical signal. According to another embodiment, the resetting time T2 may further include a readout time when the sensor included in the camera converts light corresponding to a current source frame into an electrical signal and outputs the converted electrical signal and a waiting time when the sensor included in the camera waits until starting to obtain a subsequent source frame.

According to an embodiment, a readout time included in the resetting time T2 shown in FIG. 4A and a readout time included in the resetting time T2 shown in FIG. 4B may be the same as each other.

In FIGS. 4A and 4B, T3 may refer to a maximum exposure time. The exposure time T1 may be determined by means of Equation 2 below and a graph of FIG. 5. Referring to Equation 2, the exposure value may be a value defined in a combination of a shutter speed, film sensitivity, and an aperture value (f-number), which may indicate a brightness of the result captured by means of the camera. Equation 2 is a standard about the Additive System of Photographic Exposure, and a detailed description will be omitted.

$$Ev = \log_2\left(\frac{A^2}{T1}\right) = \log_2\left(\frac{B \times S_x}{K}\right) \quad \text{[Equation 2]}$$

$$Tv = \log_2\frac{1}{T1}$$

$$Sv = \log_2(N \times S_x), (N \approx 0.32)$$

$$Bv = \log_2\left(\frac{B}{N \times K}\right), (N \approx 0.32)$$

In Equation 2 above, Ev corresponds to the exposure value, A corresponds to the aperture numerical value (f-number) of the camera, T1 corresponds to the exposure time, B corresponds to the average scene brightness, Sx corresponds to the sensitivity (ISO) of the sensor, and K corresponds to the constant value which is changed according to the photometric method.

In Equation 2 above, Tv corresponds to the shutter speed of the camera, Sv corresponds to the sensitivity of the sensor, and Bv corresponds to the luminance value indicating the average scene brightness.

The method for determining the exposure time T1 according to an embodiment using Equation 2 will be described below with reference to FIG. 5.

FIG. 4A is a drawing for describing generating a time-lapse image having a relatively low exposure value. FIG. 4B is a drawing for describing generating a time-lapse image having a relatively high exposure value.

Referring to FIG. 4A, when having a fixed image acquisition speed, a source frame obtained by capturing an external object is illustrated. According to an embodiment, one source frame may include the maximum exposure time T3. According to an embodiment, the one source frame may include the exposure time T1 and the resetting time T2. According to an embodiment, the exposure time T1 may be less than or equal to the maximum exposure time T3. The value obtained by adding the exposure time T1 and the resetting time T2 may be fixed to a frame unit time T4. The exposure time T1 may be determined by FIG. 5 described below. For convenience of description, it is assumed that the maximum exposure time T3 for the one source frame shown in FIG. 4A and the maximum exposure time T3 of the one source frame shown in FIG. 4B are the same as each other.

According to an embodiment, the sensor included in the camera may receive light during the exposure time T1. According to an embodiment, the resetting time T2 may include a readout time when light input to the camera is converted into an electrical signal and the electrical signal is output. According to an embodiment, the resetting time T2 may further include a waiting time for waiting until receiving light corresponding to a subsequent source frame.

According to an embodiment, the camera may continuously obtain a source frame. The obtained source frame may be converted into a target frame to be included in a time-lapse image. In an embodiment, all the obtained source frames may be converted into target frames. In other words, sampling is omitted or skipped, and all the source frames may be included in the time-lapse image. A speed at which the source frames are obtained may be determined by the value obtained by adding the exposure time T1 and the resetting time T2. A speed at which the target frames included in the time-lapse image are played may be different from a speed at which the source frames are obtained. For example, the speed at which the target frames are played may be 30 Fps. In other words, a speed at which frames (e.g., source frames) are obtained when capturing a time-lapse image and a speed at which frames (e.g., target frames) are played when playing the time-lapse image may be different from each other. Thus, the sampling may be more reduced than before, or may be omitted or skipped as shown in FIGS. 4A and 4B. When the number of samplings is reduced or the sampling is omitted or skipped, the number of discarded source frames may be reduced. As all of source frames are included in the target frame, that is, as the number of times the source frame is included in the completed time-lapse image increases, the completed time-lapse image may have high-performance smooth quality.

Referring to FIG. 4B, when having a fixed image acquisition speed, a source frame obtained by capturing an external object is illustrated. Because the source frame shown in FIG. 4B is almost the same as or corresponds to the source frame shown in FIG. 4A, a description will be given of a difference. According to an embodiment, FIG. 4A illustrates having a relatively low exposure value when an illumination of an environment where the time-lapse image is captured is low. FIG. 4B illustrates having a relatively high exposure value when an illumination of an environment where the time-lapse image is captured is high. According to an embodiment, the camera may obtain a time-lapse image having suitable brightness. The time-lapse image having the sufficient brightness may not be a saturation video due to excessive light.

Referring to FIGS. 4A and 4B, the exposure time T1 of FIG. 4B may be relatively shorter than the exposure time T1 of FIG. 4A. Because the frame unit times T4 shown in FIGS. 4A and 4B are the same as each other, the resetting time T2 of FIG. 4B may be longer than the resetting time T2 of FIG. 4A. In an embodiment, the readout times included in the resetting times T2 of FIGS. 4A and 4B may have the same value, and the waiting times included in the resetting times T2 may have different values. Referring to FIGS. 4A and 4B, the camera according to an embodiment may adjust the waiting times included in the resetting times T2 to control the frame unit times T4 to be the same as each other.

Referring to FIGS. 4A and 4B, all the obtained source frames may be converted into target frames. In other words, as sampling for the obtained source frame is omitted (skipped), all the source frames may be included in the time-lapse image. A speed at which the source frame is obtained may be determined by the value obtained by adding the exposure time T1 and the resetting time T2. According to an embodiment, a speed at which the time-lapse image is played may be different from a speed at which the source frames are obtained. In other words, a speed at which frames (e.g., source frames) are obtained when capturing a time-lapse image and a speed at which frames (e.g., target frames) are played when playing the time-lapse image may be different from each other as described above. According to an embodiment, the number of samplings may be reduced, or the sampling may be omitted or skipped as shown in FIG. 4B. When the number of samplings is reduced or the sampling is omitted or skipped, the number of discarded source frames may be reduced. As all of source frames are included in the target frame, that is, as the number of times the source frame is included in the completed time-lapse image increases, the completed time-lapse image may have high-performance smooth quality.

Figure 5:
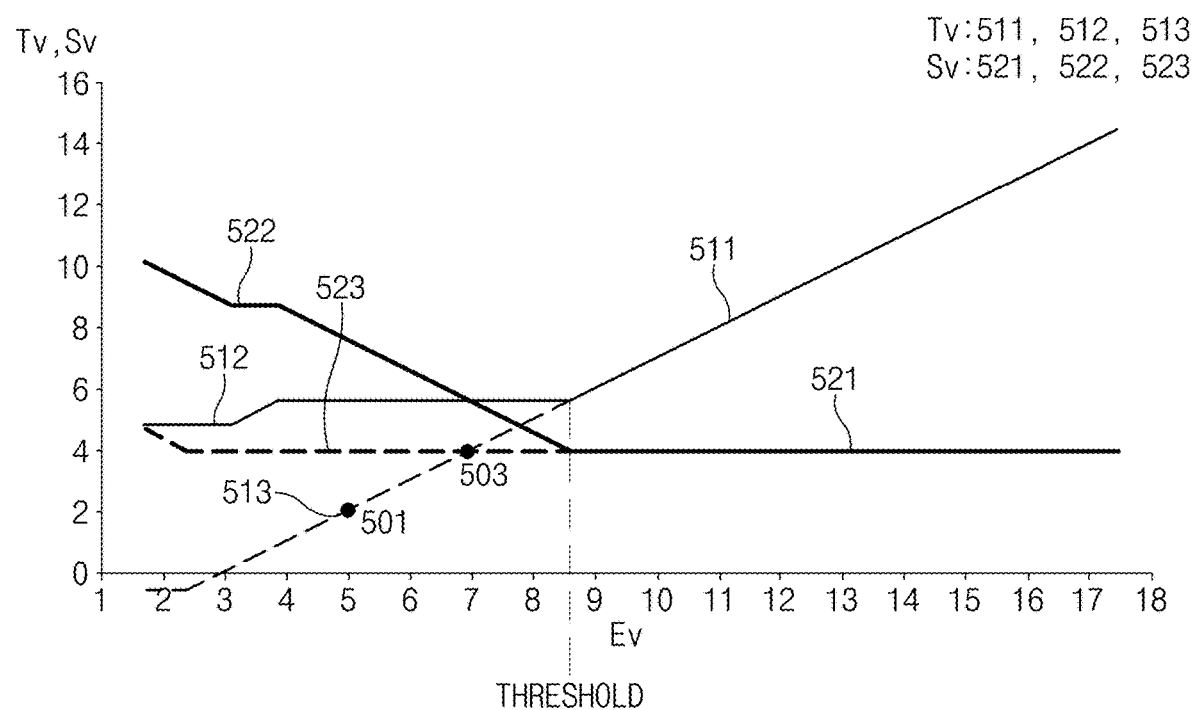
FIG. 5 is a graph illustrating a relationship between a shutter speed and film sensitivity according to an exposure value, when a specified maximum exposure time is 1.5 seconds, according to various embodiments.

FIG. 5 is a graph illustrating a relationship between a shutter speed and film sensitivity according to an exposure value, when a specified maximum exposure time is 1.5 seconds, according to various embodiments.

According to an embodiment, exposure times T1 of FIGS. 4A and 4B may be determined according to a line drawing shown in FIG. 5. For example, referring to FIG. 5, a shutter speed Tv according to an exposure value Ev is illustrated. As the exposure value Ev is specified, when a value of the shutter speed Tv corresponding to the exposure value Ev is determined, a corresponding exposure time T1 may be determined by Equation 2. According to an embodiment, the shutter speed Tv for the exposure value follows a first line drawing 511 and a second line drawing 512. At this time, when the exposure value is less than or equal to a threshold, the shutter speed Tv may follow a third line drawing 513.

According to an embodiment, film sensitivity Sv for the exposure value follows a fourth line drawing 521 and a fifth line drawing 522. At this time, when the exposure value is less than or equal to the threshold, the film sensitivity Sv for the exposure value may follow a sixth line drawing 523.

According to an embodiment, a time-lapse image corresponding to a desired exposure value may be generated in a state where sensitivity of a sensor of a camera is not increased. For example, it may be assumed that the sensitivity of the sensor is ISO100. The method for obtaining the exposure time T1 will be described below. Referring to FIG. 5, when the exposure value is less than or equal to the threshold, the shutter speed Tv according to the exposure value may be determined by the third line drawing 513, and the film sensitivity Sv according to the exposure value may be determined by the sixth line drawing 523.

A first state 501 of FIG. 5 may indicate that the shutter speed is 2 depending on the third line drawing 513, when the exposure value is 5. Because the shutter speed is 2 in the first state 501 of FIG. 5, according to a relationship between the shutter speed and the exposure time T1 in Equation 2, it may be seen that the exposure time T1 corresponding to the first state 501 is ¼ seconds.

A second state 503 of FIG. 5 may indicate that the shutter speed is 4 depending on the third line drawing 513, when the exposure value is 5. Because the shutter speed is 4 in the second state 503 of FIG. 5, according to a relationship between the shutter speed and the exposure time T1 in Equation 2, it may be seen that the exposure time T1 corresponding to the second state 503 is 1/16 seconds. Referring to FIG. 5, according to an embodiment, it is identified that the exposure time T1 is reduced as the exposure value is large by comparing the first state 501 with the second state 503.

An electronic device (e.g., the electronic device 101 of FIG. 1 or the electronic device 200 of FIG. 2) according to an embodiment of the disclosure may include a display (e.g., the display device 160 of FIG. 1 or the display 240 of FIG. 2), a camera (e.g., the camera module 180 of FIG. 1 or the camera 210 of FIG. 2), a memory (e.g., the memory 130 of FIG. 1 or the memory 220 of FIG. 2), and a processor (e.g., the processor 120 of FIG. 1 or the processor 230 of FIG. 2) operatively connected with the display, the camera, and the memory. According to an embodiment, the memory may store instructions, when executed, causing the processor to determine a number of at least one source frame included per unit second depending on a specified maximum exposure time, receive light reflected from an external object during an exposure time determined according to a specified exposure value, using the camera, convert the light into an electric signal to generate source frames, and generate a time-lapse image including at least one target frame indicating motion of the external object over time, using the source frames. The source frames may be generated at a speed different from a speed when the time-lapse image including the at least one target frame is played.

According to an embodiment, each of the source frames may include a first interval corresponding to the exposure time and a second interval corresponding to a predetermined readout time. The first interval may decrease in magnitude as the specified exposure value increases.

According to an embodiment, the source frames may be generated at a speed less than the speed of playing the time-lapse image including the at least one target frame.

According to an embodiment, the instructions may cause the processor to include all the source frames in the time-lapse image.

According to an embodiment, the instructions may cause the processor to include some of the source frames in the time-lapse image.

According to an embodiment, the number of the at least one source frame included per unit second is greater than or equal to N. The instructions may cause the processor to select source frames every N among the generated source frames and generate the time-lapse image including the selected source frames.

According to an embodiment, the instructions may cause the processor to maintain an auto focusing (AF) function of the camera for automatically adjusting focus on the external object in a lock state.

According to an embodiment, the instructions may cause the processor to make a number in which the at least one source frame is generated per unit second and a number of the at least one target frame played per unit second when the time-lapse image including the at least one target frame is played on the display, different from each other.

According to an embodiment, the instructions may cause the processor to display a preview image on the display, while the time-lapse image is generated.

According to an embodiment, the different speed may include a first speed and a second speed corresponding to a magnitude different from the first speed.

Figure 6:
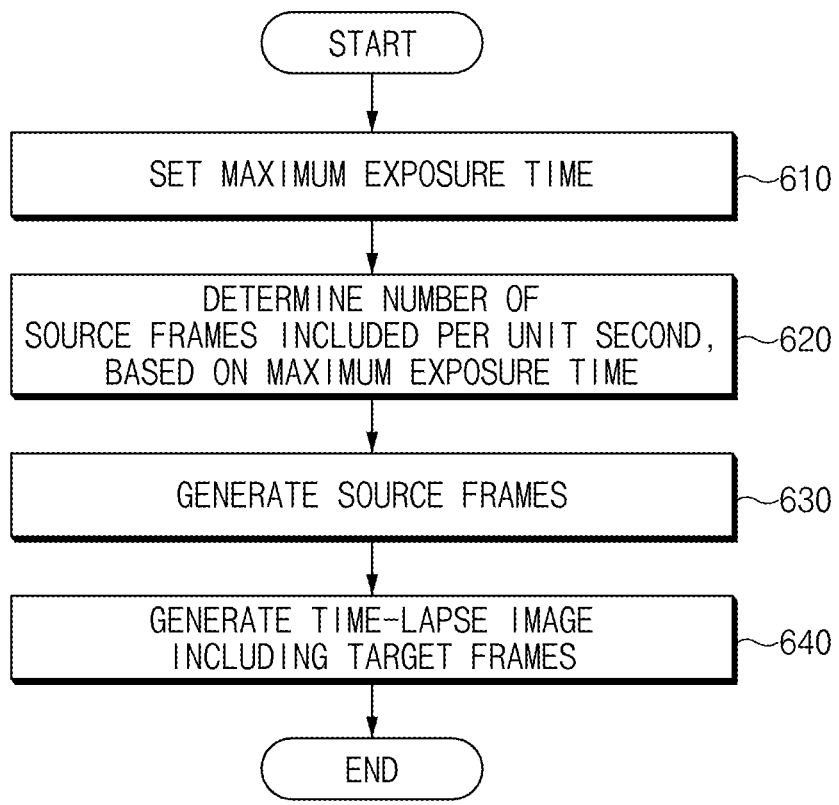
FIG. 6 is a flowchart of a control method of an electronic device, according to various embodiments.

FIG. 6 is a flowchart of a control method of an electronic device, according to various embodiments.

According to an embodiment, in operation 610, an electronic device (e.g., the electronic device 101 of FIG. 1 or the electronic device 200 of FIG. 2) may set a maximum exposure time of a camera (e.g., the camera module 180 of FIG. 1 or the camera 210 of FIG. 2) to capture an external object. Alternatively, the electronic device may specify the maximum exposure time of the camera. For example, the maximum exposure time (T3 of FIG. 4A and T3 of FIG. 4B) may be set, before starting to capture a time-lapse image. The maximum exposure time may be set by an input of a user. In another embodiment, the maximum exposure time may be determined according to an internal algorithm of the electronic device.

According to an embodiment, in operation 620, the electronic device (e.g., a processor) may determine the number of source frames included per unit second, based on the maximum exposure time specified in operation 610. For example, a frame unit time taken to obtain one source frame may be determined by adding the specified maximum exposure time and a resetting time taken to read out one source frame. Alternatively, according to Equation 1, an image acquisition speed at which the source frame is obtained may be determined using the maximum exposure time and the resetting time.

According to an embodiment, in operation 630, the electronic device may obtain source frames at a speed corresponding to the number of source frames included per unit second, which is determined in operation 620, using a camera included in the electronic device. Alternatively, the processor may control the camera to generate source frames at a fixed speed depending on the maximum exposure time set in operation 610. For example, when the processor determines the number of the source frames included per unit second as 2 (2 Fps) based on the maximum exposure time in operation 620, in operation 630, the camera may capture an external object at 2 Fps to obtain source frames. In another example, in operation 620, the processor may determine the number of the source frames included per unit second as 1 (1 Fps) based on the maximum exposure time. In operation 630, the camera may capture the external object at 1 Fps to obtain one source frame per second. According to an embodiment, in operation 630, a continuous auto focusing (CAF) or auto focusing (AF) function of the camera may be deactivated. In other words, the CAF or AF function may be in a lock state. Because the CAF or AF function is a function for obtaining a high-quality image when a speed at which the frame is generated is relatively fast, the camera according to an embodiment may set the CAF or AF function to a lock state. In another embodiment, a function for changing AF during image capture, for example, a touch AF may be deactivated. According to an embodiment, a preview image displayed on a display (e.g., the display device 160 of FIG. 1 or the display 240 of FIG. 2) may be seen slower than a normal speed. While operation 630 is performed, the display may display a message indicating that image capture is being performed using long exposure in a manner such as pop-up.

According to an embodiment, in operation 640, the processor may generate a time-lapse image including target frames. For example, the processor may generate a time-lapse image using the source frames generated in operation 630. The time-lapse image may include target frames. The target frames may include the source frames generated in operation 630 and may be played at a predetermined speed. For example, in operation 630, the processor may generate a time-lapse image to be played at the predetermined speed (e.g., 30 Fps). According to an embodiment, according to the maximum exposure time set in operation 620, in operation 630, the camera may generate source frames. A speed at which the source frames are generated in operation 630 may be different from a speed at which the generated time-lapse image is played in operation 640. For example, in operation 630, it may be assumed that the source frames are generated at a speed of 1 Fps. In operation 640, the processor may process the target frames such that the time-lapse image is played at a speed of 30 Fps.

According to an embodiment, the target frames processed in operation 640 may include all the source frames generated in operation 630. According to an embodiment, the electronic device may omit or skip sampling for the source frames generated in operation 630 and may include all the source frames in the time-lapse image. Because there is no frame which is not included in the target frame among the source frames generated in operation 630, the time-lapse image may have high-performance smooth quality without interruption.

Figure 7:
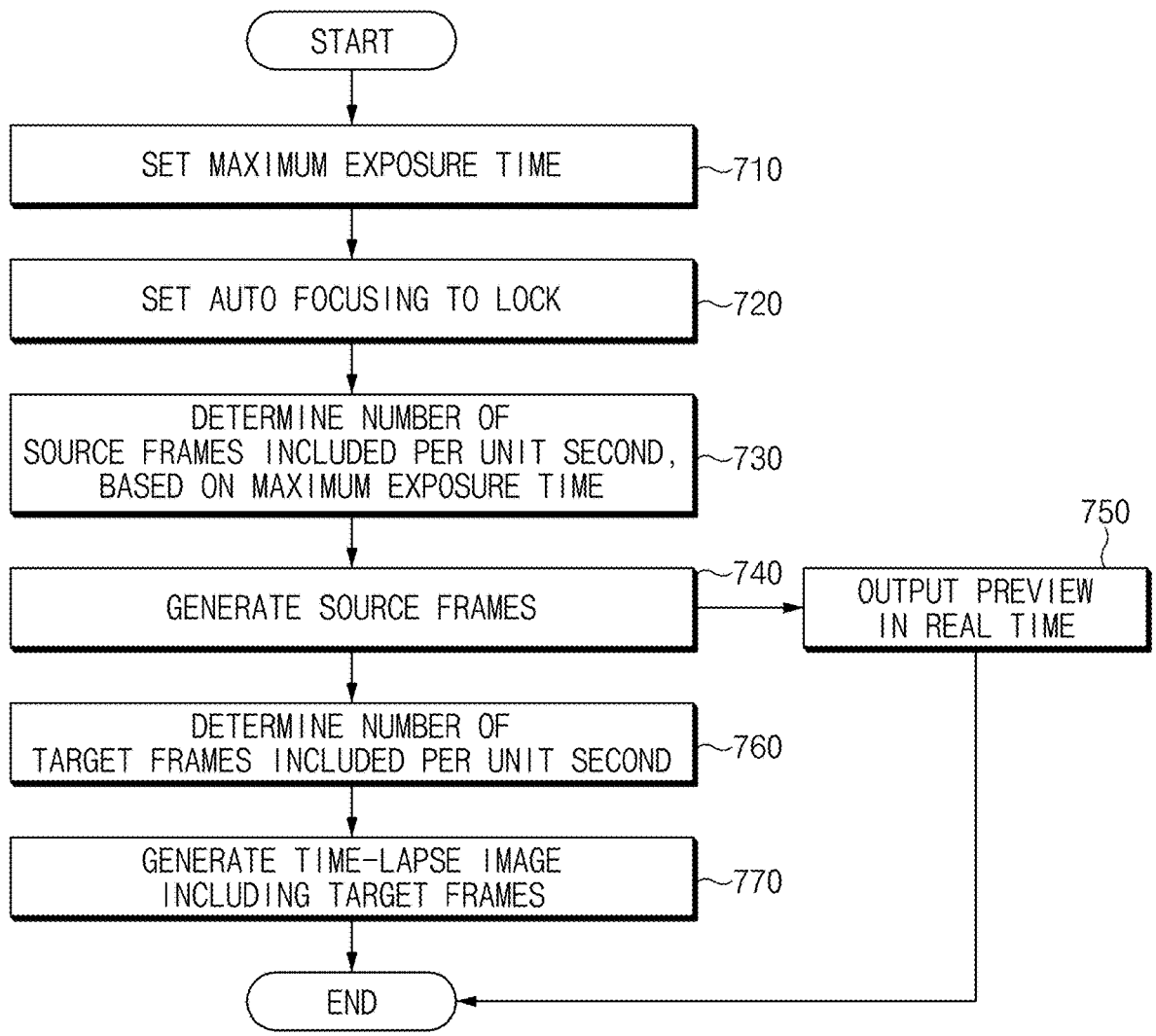
FIG. 7 is a flowchart of a control method of an electronic device, according to various embodiments.

FIG. 7 is a flowchart of a control method of an electronic device, according to various embodiments.

According to an embodiment, in operation 710, the electronic device (e.g., the electronic device 101 of FIG. 1 or the electronic device 200 of FIG. 2) may set a maximum exposure time of a camera (e.g., the camera module 180 of FIG. 1 or the camera 210 of FIG. 2) to capture an external object. Alternatively, the electronic device may specify the maximum exposure time of the camera. Because operation 710 is the same as or corresponds to operation 610 of FIG. 6, a duplicated description will be omitted.

According to an embodiment, in operation 720, the electronic device may set an auto focusing (AF) of the camera to lock. According to another embodiment, the processor may set a continuous auto focusing (CAF) or touch AF function of the camera to a lock state. Being set to the lock state may refer to being the same as or corresponding to being deactivated.

According to an embodiment, in operation 730, the electronic device may determine the number of source frames included per unit second, based on the maximum exposure time set in operation 710. Because operation 730 is the same as or corresponds to operation 620 of FIG. 6, a duplicated description will be omitted.

According to an embodiment, in operation 740, the electronic device may obtain source frames at a speed corresponding to the determined number of the source frames included per unit second, which is determined in operation 730, using the camera. According to another embodiment, in operation 740, the electronic device may vary a speed at which the source frames are obtained by means of the camera. For example, the electronic device may control the camera to generate source frames depending on a speed determined according to the maximum exposure time set in operation 710 and a speed different from it.

According to an embodiment, in operation 750, the electronic device may display a preview in real time using a display (e.g., the display device 160 of FIG. 1 or the display 240 of FIG. 2). The preview may be a preview image for previously showing a time-lapse image to be generated. According to an embodiment, in operation 740, the electronic device may vary a speed at which the source frames are generated, before ending capturing the time-lapse image. This is to vary a playback speed of the preview output to the display in operation 750. For example, in operation 740, the source frames may be generated at a speed of 1 Fps and may be varied and generated at a speed of 2 Fps. In response, in operation 750, the preview may be output at a speed of 1 Fps and may then be output at a speed of 2 Fps. A user may see the preview output to the display. Because the playback speed of the output preview is varied, the user may also recognize the preview in which the playback speed is varied.

According to an embodiment, in operation 780, the electronic device may determine the number of target frames included per unit second. The target frame may be a frame included in the completed time-lapse image. For example, the number of the target frames included per unit second may be determined as 30. In other words, the completed time-lapse image may refer to being played at a speed (30 Fps) of 30 frames per unit second.

According to an embodiment, in operation 770, the processor may generate a time-lapse image including the target frames. In operation 770, the processor may generate the time-lapse image to correspond to the number of the target frames included per unit second, which is determined in operation 760. For example, it may be assumed that the number of the target frames included per unit second is determined as 30 in operation 760. In response, in operation 770, the processor may generate the time-lapse image including the target frames to be played at a speed of 30 Fps. According to an embodiment, the target frames shown in operation 770 may include all the source frames generated in operation 740. For example, the electronic device may omit or skip sampling for the source frames generated in operation 740 and may include all the source frames in the time-lapse image. Because there is no frame which is not included in the target frame among the source frames generated in operation 740, the time-lapse image may have seamless high-performance smooth quality.

FIGS. 8A and 8B are drawings for describing contents of varying a speed at which source frames are generated.

According to an embodiment, FIG. 8A illustrates that a maximum exposure time of a camera is set to T3. The maximum exposure time T3 may be set by an input of a user or a program stored in an electronic device. According to an embodiment, the camera may have an exposure time T1. According to an embodiment, the camera may have a resetting time T2. The resetting time T2 may include a readout time when input light is converted into an electrical signal and the electrical signal is output. The resetting time T2 according to an embodiment may fail to include a waiting time. The exposure time T1 may be less than or equal to the maximum exposure time T3. Because the maximum exposure time is set to T3, a speed at which the source frames are obtained may be 1/(T3+T2) Fps depending on Equation 1. When the exposure time T1 is the same as the maximum exposure time T3, the speed at which the source frames are obtained may be 1/(T1+T2) Fps.

According to an embodiment, FIG. 8B illustrates that a maximum exposure time of a camera is varied. A maximum exposure time T4 may be specified by an input of the user or a program stored in the electronic device. According to an embodiment, an exposure time T5 may be less than or equal to the maximum exposure time T4. Referring to Equation 1, the speed at which the source frames are obtained may be 1/(T4+T2) Fps. When the exposure time T5 is the same in magnitude as the maximum exposure time T4, the speed at which the source frames are obtained may be 1/(T5+T2) Fps.

Referring to FIGS. 8A and 8B, the resetting time T2 for each source frame may have the same value.

According to an embodiment, a time-lapse image including at least some of source frames obtained at different speeds may be generated. The finally generated time-lapse image may include at least one target frame. At least a portion of the target frame may be a source frame obtained at a first speed, and the other may be a source frame obtained at a second speed. For example, the speed at which the source frames are obtained may change from 1/(T1+T2) Fps to 1/(T5+T2) Fps. According to an embodiment, sampling for source frames may be omitted or skipped. Because there is no sampling for source frames, the time-lapse image may have seamless high-performance smooth quality.

According to an embodiment, while the time-lapse image including target frames is generated using source frames obtained at a varied speed, the display may display a preview or a preview image of the time-lapse image. The user may recognize the preview by means of the display.

Figure 9:
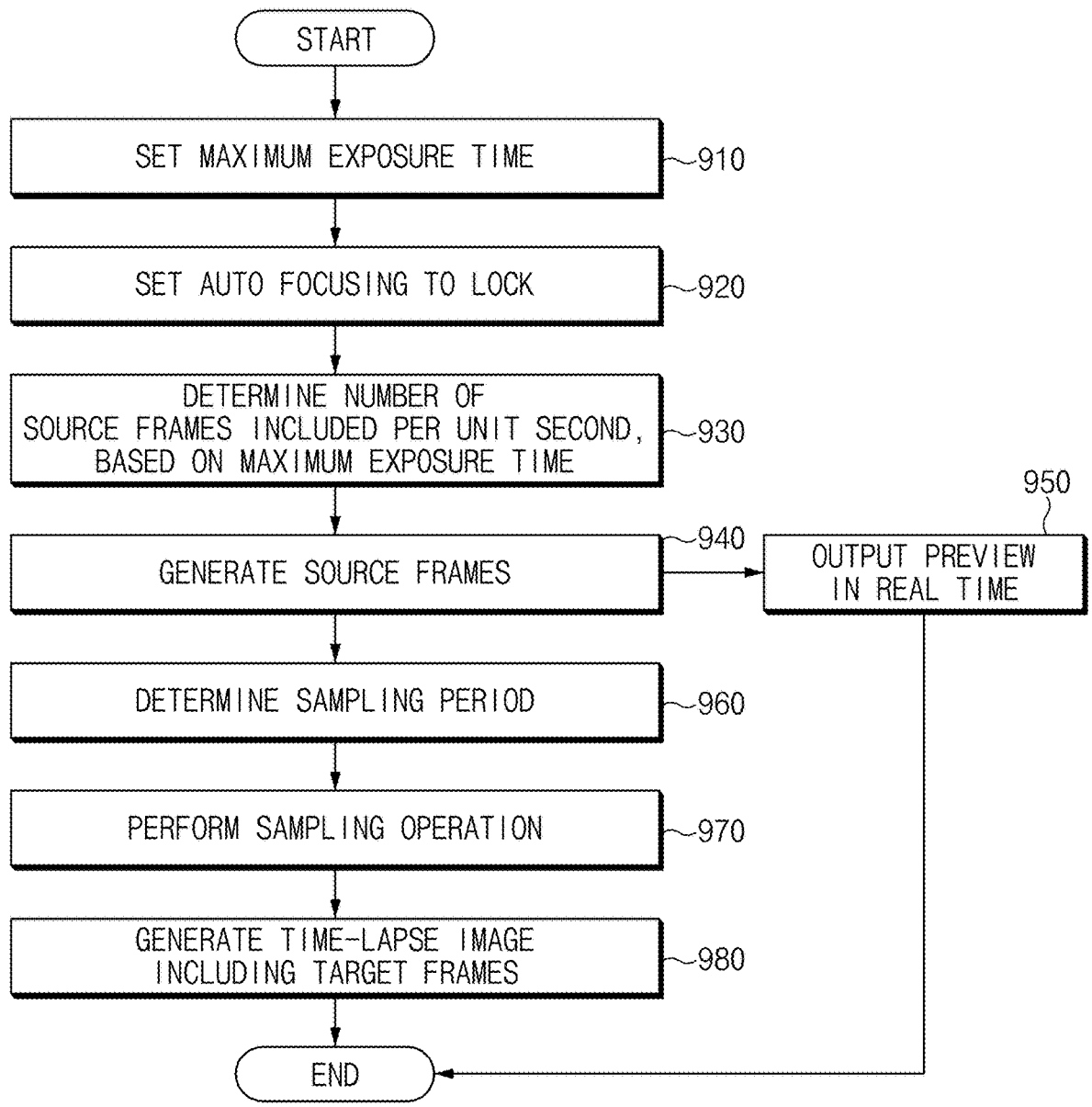
FIG. 9 is a flowchart of a control method of an electronic device, according to various embodiments.

FIG. 9 is a flowchart of a control method of an electronic device, according to various embodiments.

According to an embodiment, in operation 910, the electronic device (e.g., the electronic device 101 of FIG. 1 or the electronic device 200 of FIG. 2) may set a maximum exposure time of a camera (e.g., the camera module 180 of FIG. 1 or the camera 210 of FIG. 2) to capture an external object. Because detailed contents are the same as or corresponds to operation 710 of FIG. 7, a duplicated description will be omitted.

According to an embodiment, in operation 920, the electronic device may set at least one of an auto focusing (AF) function, a continuous auto focusing (CAF) function, or a touch AF function of the camera to lock.

According to an embodiment, in operation 930, the electronic device may determine the number of source frames included per unit second, based on the maximum exposure time set in operation 910. Because operation 930 is the same as or corresponds to operation 730 of FIG. 7, a duplicated description will be omitted.

According to an embodiment, in operation 940, the electronic device may obtain a source frame at a speed corresponding to the number of the source frames included per unit second, which is determined in operation 930, using the camera. According to an embodiment, in operation 940, the camera may vary a speed at which the source frame is obtained.

According to an embodiment, in operation 950, the electronic device may display a preview in real time using a display (e.g., the display device 160 of FIG. 1 or the display 240 of FIG. 2). The preview may be a preview image for previously showing a time-lapse image to be generated. Because operation 950 is the same as or corresponds to operation 750 of FIG. 7, a duplicated description will be omitted.

According to an embodiment, in operation 960, the electronic device may determine a sampling period N. According to an embodiment, the speed at which the camera obtains source frames may be varied. For example, while obtaining source frames at a first image acquisition speed, the camera may obtain source frames at a second image acquisition speed. The sampling period N may be determined by Equation 3.

$$N = \frac{a2}{a1}, (N \text{ is positive integer}) \quad [\text{Equation 3}]$$

In Equation 3 above, a1 corresponds to the first image acquisition speed, and a2 corresponds to the second image acquisition speed.

According to an embodiment, the sampling period N may refer to selecting one source frame every N source frames among the source frames generated in operation 940. In operation 980, a time-lapse image may be generated using the selected source frames. A maximum exposure time T3 may be set in operation 910 or may be a specified value. A readout time included in a resetting time T2 may correspond to a time when the camera converts input light into an electrical signal. An exposure time T1 may be a value derived according to an exposure value. Because the exposure time T1 is illustratively described in a description of FIG. 5, a duplicated description will be omitted. According to an embodiment, when the sampling period N determined by Equation 3 is a positive integer, the electronic device may perform sampling. For example, when the sampling period N is 1, the electronic device may omit or skip sampling for a source frame. In another example, when the sampling period N is 2, the electronic device may perform sampling of selecting one source frame every two source frames. The source frame selected by means of the sampling may be a target frame. When compared with FIG. 3B, in operation 970, the sampling period N may be relatively small. Thus, according to the sampling performed in operation 970, relatively many source frames may be included in a time-lapse image. Alternatively, source frames excluded from the time-lapse image may be reduced. According to an embodiment, the time-lapse image may have high-performance smooth quality with less interruption.

According to an embodiment, in operation 940, the electronic device may vary a speed at which the source frame is obtained. According to an embodiment, a playback speed of the time-lapse image to be generated finally may be predetermined. For example, the time-lapse image may include a target frame, and a playback speed of the target frame may be 30 Fps. According to an embodiment, the electronic device may obtain a first source frame at a first image acquisition speed corresponding to 1 Fps. Thereafter, the electronic device may obtain a second source frame at a second image acquisition speed corresponding to 2 Fps. When converting a playback speed into 30 Fps to correspond to the playback speed of the target frame, a user may recognize a first source frame having 30× speed and a second source frame having 60× speed. In operation 970, the electronic device may perform sampling in which the sampling period N is 2 with respect to the second source frame, such that the user recognizes a time-lapse image having uniform double speed.

According to an embodiment, in operation 980, the electronic device may generate a time-lapse image including the target frames. In operation 980, the processor may generate the time-lapse image to correspond to the number of the target frames included per unit second, which is determined in operation 960. The electronic device may sample source frames depending on the sampling period N determined in operation 970 or may omit or skip the sampling. According to an embodiment, the target frames may obtain two or more source frames having different image acquisition speeds.

Figure 10:
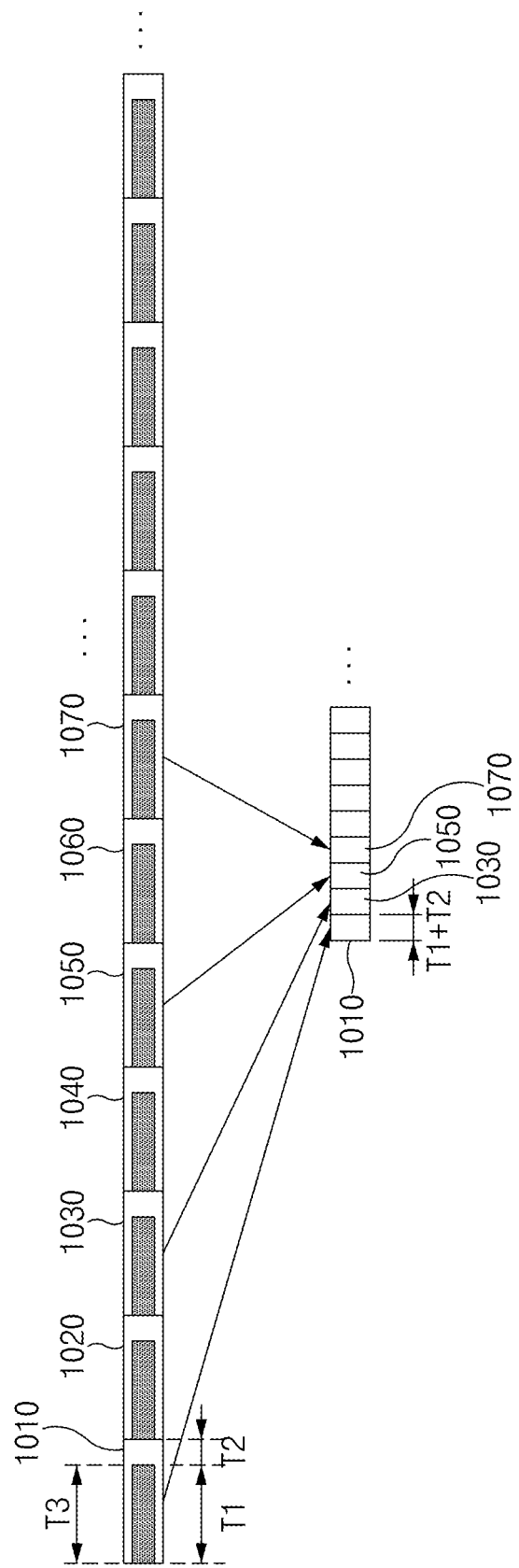
FIG. 10 is a drawing for describing sampling for a source frame shown in FIG. 9.

FIG. 10 is a drawing for describing sampling for a source frame shown in FIG. 9.

According to an embodiment, it is assumed that a sampling period N is 2. In operation 940 of FIG. 9, a source frame may be generated. FIG. 10 illustrates that a plurality of source frames 1010 to 1070 are generated. It is assumed that the maximum exposure time is set to T3, the exposure time is set to T1, and the resetting time is set to T2 in each source frame. According to an embodiment, the electronic device may obtain a 1010th source frame 1010 at a first image acquisition speed. The electronic device may obtain a 1030th source frame 1030 at the first image acquisition speed. According to another embodiment, the electronic device may obtain the 1010th source frame 1010 at the first image acquisition speed. The electronic device may obtain the 1030th source frame 1030 at a second image acquisition speed. It is assumed that the sampling period N determined by Equation 3 is 2. Because the sampling period N is 2, the 1010th source frame 1010, the 1030th source frame 1030, a 1050th source frame 1050, a 1070th source frame 1070, and the like may be selected. The selected source frames may become target frames. The target frames may be included in a finally generated time-lapse image. A playback speed of the finally generated time-lapse image may be different from a speed at which the source frame is generated or obtained. For example, the speed at which the source frame is generated may be 1 Fps and 2 Fps. The playback speed of the finally generated time-lapse image may be 30 Fps.

FIG. 11 is a drawing illustrating a time-lapse image, according to various embodiments.

According to an embodiment, the time-lapse image may include a moving video. A first state 1110 and a second state 1130 of FIG. 11 may indicate any one time point in a time-lapse image generated in the same illumination environment. For example, the first state 1110 and the second state 1130 of FIG. 11 may be any one target frame of a time-lapse image generated in a low illumination environment at night.

The first state 1110 of FIG. 11 illustrates a time-lapse image including much noise generated when an illumination of a surrounding environment is low. Referring to the first state 1110 of FIG. 11, the momentary appearance of a moving external object may only be displayed and a trajectory of the moving external object may fail to be displayed.

According to an embodiment, the illumination of the surrounding environment in the second state 1130 of FIG. 11 may be the same as or similar to the illumination of the surrounding environment in the first state 1110 of FIG. 11. For example, the second state 1130 of FIG. 11 illustrates a time-lapse image generated when the illumination of the surrounding environment is low. The second state 1130 of FIG. 11 may include relatively less noise than the first state 1110 of FIG. 11 and may more clearly display the trajectory of the moving external object than the first state 1110 of FIG. 11. According to an embodiment, the time-lapse image may use a relatively long exposure. According to an embodiment, sampling may be omitted or skipped for the time-lapse image or the time-lapse image may have a sampling period N of a relatively small magnitude. The trajectory of the moving external object may be clearly displayed on the time-lapse image according to an embodiment.

A control method of an electronic device (e.g., the electronic device 101 of FIG. 1 or the electronic device 200 of FIG. 2) according to an embodiment of the disclosure may include setting a maximum exposure time, determining the number of at least one source frame included per unit second based on the maximum exposure time, receiving light reflected from an external object during an exposure time determined according to a specified exposure value, converting the light into an electrical signal to generate source frames, and generating a time-lapse image including at least one target frame indicating motion of the external object over time, using the source frames. The generating of the source frames may include generating the source frames at a speed different from a speed at which the time-lapse image including the at least one target frame is played.

According to an embodiment, each of the source frames may include a first interval corresponding to the exposure time and a second interval corresponding to a predetermined readout time. The first interval may decrease in magnitude as the specified exposure value increases.

According to an embodiment, the generating of the source frames may include generating the source frames at a speed less than the speed at which the time-lapse image including the at least one target frame is played.

According to an embodiment, the generating of the time-lapse image may include controlling such that all the source frames are included in the time-lapse image.

According to an embodiment, the generating of the time-lapse image may further include controlling such that some of the source frames are included in the time-lapse image.

According to an embodiment, the number of the at least one source frame included per unit second is greater than or equal to N. The generating of the time-lapse image may further include sampling source frames select every N among the source frames and including the selected source frames in the target frames.

According to an embodiment, the generating of the source frames may further include maintaining an auto focusing (AF) function of the camera for automatically adjusting focus on the external object in a lock state.

According to an embodiment, the generating of the time-lapse image may include processing a number in which the at least one source frame is generated per unit second and the number of the at least one target frame played per unit second, when the time-lapse image is played on a display, to be different from each other.

According to an embodiment, the method may further include displaying a preview image on a display, while the time-lapse image is generated.

According to an embodiment, the generating of the source frames may include generating the one source frames at a first speed different from the speed at which the time-lapse image including the at least one target frame is played and generating the one source frames at a second speed different from the first speed.

According to embodiments disclosed in the disclosure, a frame displaying an external object may be obtained according to a speed at which a frame corresponding to a specified maximum exposure time is obtained.

According to embodiments disclosed in the disclosure, the maximum exposure time may be set and sampling for a frame displaying an external object may be skipped to obtain a seamless time-lapse image.

According to embodiments disclosed in the disclosure, a time-lapse image in which a speed at which the frame is obtained when the camera captures an external object and a playback speed when the completed time-lapse image is played are different from each other may be obtained.

According to embodiments disclosed in the disclosure, the camera may be set to a long exposure in an environment having low illumination and a high-performance time-lapse image indicating a light sagging effect may be obtained.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device, comprising:
    a display;
    a camera;
    a memory; and
    a processor operatively connected with the display, the camera, and the memory,
    wherein the memory stores instructions, when executed, causing the processor to:
        set a maximum exposure time based on an input of a user or a specified algorithm;
        determine a number of at least one source frame per unit second based on the maximum exposure time and a resetting time taken to read out the at least one source frame;
        receive light reflected from an external object during an exposure time determined according to a specified exposure value using the camera, the determined exposure time being less than the maximum exposure time;
        generate source frames at a first speed corresponding to the determined number of at least one source frame per unit second based on the received light; and
        generate a time-lapse image including at least one target frame indicating motion of the external object over time based on the source frames, and
        wherein the first speed is different from a second speed at which the time-lapse image including the at least one target frame is played.

2. The electronic device of claim 1, wherein each of the source frames comprises a first interval corresponding to the exposure time and a second interval corresponding to a predetermined readout time, and
    wherein the first interval decreases in magnitude as the specified exposure value increases.

3. The electronic device of claim 1, wherein the source frames are generated at a speed less than the speed at which the time-lapse image including the at least one target frame is played.

4. The electronic device of claim 1, wherein the instructions cause the processor to:
    include all the source frames in the time-lapse image.

5. The electronic device of claim 1, wherein the instructions cause the processor to:
    include some of the source frames in the time-lapse image.

6. The electronic device of claim 1, wherein the number of the at least one source frame per unit second is greater than or equal to N, N being a positive integer, and
    wherein the instructions cause the processor to:

select source frames every N among the generated source frames; and
generate the time-lapse image including the selected source frames.

7. The electronic device of claim 1, wherein the instructions cause the processor to:
maintain an auto focusing (AF) function of the camera for automatically adjusting focus on the external object in a lock state.

8. The electronic device of claim 1, wherein the instructions cause the processor to:
display a preview image on the display while the time-lapse image is generated.

9. The electronic device of claim 1, wherein the second speed has a magnitude different from a magnitude of the first speed.

10. An electronic device, comprising:
a display;
a camera;
a memory; and
a processor operatively connected with the display, the camera, and the memory,
wherein the memory stores instructions, when executed, causing the processor to:
determine a number of at least one source frame per unit second based on a specified maximum exposure time;
receive light reflected from an external object during an exposure time determined according to a specified exposure value using the camera;
generate source frames based on the received light; and
generate a time-lapse image including at least one target frame indicating motion of the external object over time based on the source frames, and
wherein the instructions cause the processor to generate the source frames at a speed different from a speed at which the time-lapse image including the at least one target frame is played, and
wherein the instructions cause the processor to:
make a number in which the at least one source frame is generated per unit second and a number of the at least one target frame played per unit second when the time-lapse image including the at least one target frame is played on the display, different from each other.

11. A control method of an electronic device, the control method comprising:
setting a maximum exposure time based on an input of a user or a specified algorithm;
determining a number of at least one source frame per unit second based on the maximum exposure time and a resetting time taken to read out the at least one source frame;
receiving light reflected from an external object during an exposure time determined according to a specified exposure value, the determined exposure time being less than the maximum exposure time;
generating source frames at a first speed corresponding to the determined number of at least one source frame per unit second based on the received light; and
generating a time-lapse image including at least one target frame indicating motion of the external object over time based on the generated source frames,
wherein the generating of the source frames comprises:
generating the source frames at the first speed different from a second speed at which the time-lapse image including the at least one target frame is played.

12. The control method of claim 11, wherein each of the source frames includes a first interval corresponding to the exposure time and a second interval corresponding to a predetermined readout time, and
wherein the first interval decreases in magnitude as the specified exposure value increases.

13. The control method of claim 11, wherein the generating of the source frames comprises:
generating the source frames at a speed less than the speed at which the time-lapse image including the at least one target frame is played.

14. The control method of claim 11, wherein the generating of the time-lapse image comprises:
generating the time-lapse image to include all the source frames.

15. The control method of claim 11, wherein the generating of the time-lapse image comprises generating the time-lapse image to include some of the source frames.

16. The control method of claim 11, wherein the number of the at least one source frame per unit second is greater than or equal to N, N being a positive integer, and
wherein the generating of the time-lapse image comprises:
selecting source frames every N among the generated source frames; and
generate the time-lapse image including the selected source frames.

17. The control method of claim 11, further comprising maintaining an auto focusing (AF) function of a camera for automatically adjusting focus on the external object in a lock state.

18. The control method of claim 11, further comprising displaying a preview image on the display while the time-lapse image is generated.

19. A non-transitory computer-readable storage medium having recorded thereon a program for executing the method of claim 11.

20. A control method of an electronic device, the control method comprising:
setting a maximum exposure time;
determining a number of at least one source frame per unit second based on the maximum exposure time;
receiving light reflected from an external object during an exposure time determined according to a specified exposure value and generating source frames based on the received light; and
generating a time-lapse image including at least one target frame indicating motion of the external object over time based on the generated source frames,
wherein the generating of the source frames comprises:
generating the source frames at a speed different from a speed at which the time-lapse image including the at least one target frame is played; and
wherein the generating of the time-lapse image includes:
processing a number in which the at least one source frame is generated per unit second and a number of the at least one target frame played per unit second when the time-lapse image including the at least one target frame is played on a display, to be different from each other.

* * * * *